Patented Oct. 10, 1950

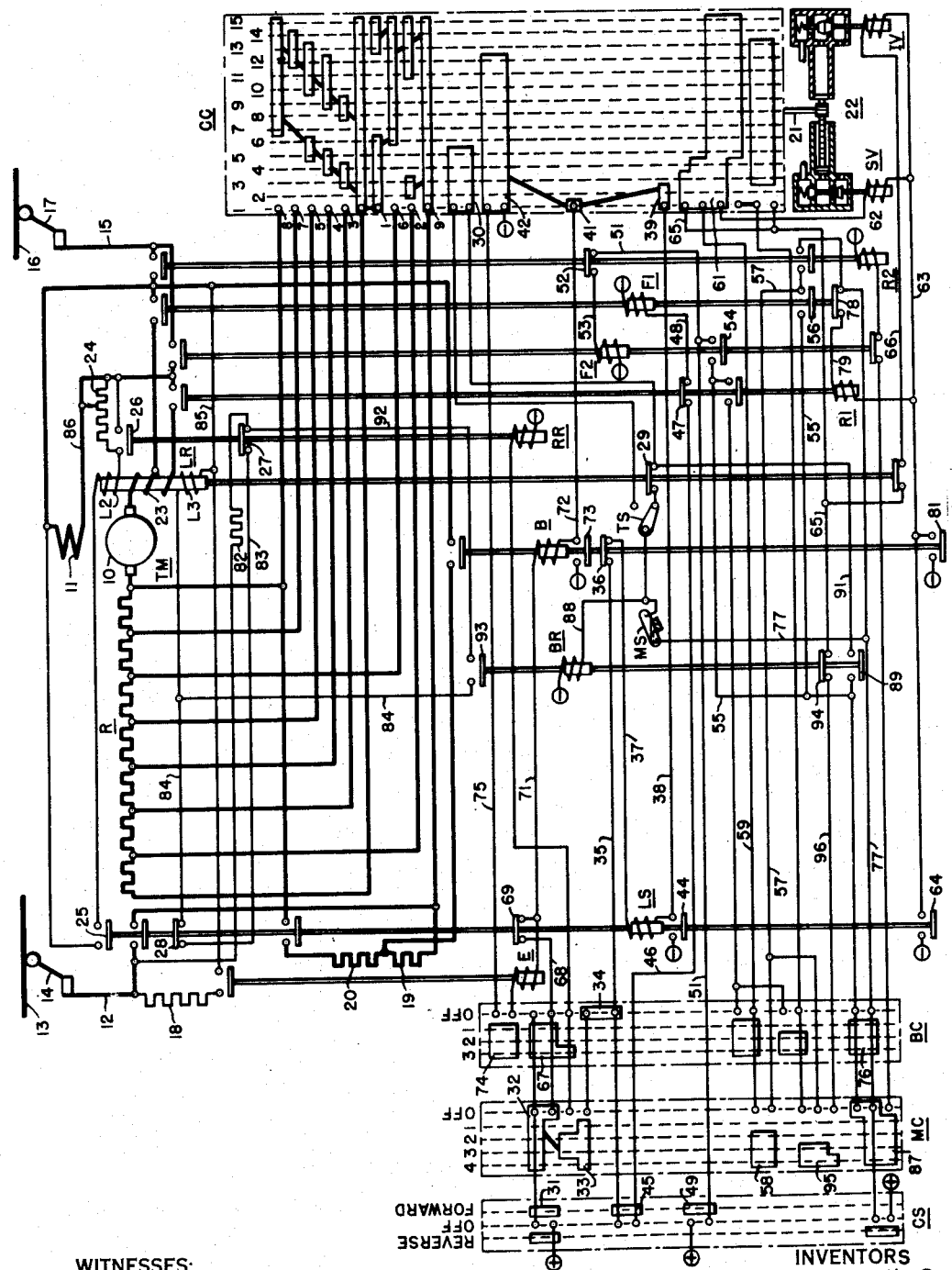

2,525,507

UNITED STATES PATENT OFFICE 2,525,507

AUTOMATIC CONTROL FOR BOOSTER RELAY ON ELECTRIC VEHICLES

Herbert H. Wentworth, Atlanta, and John M. Jeffrey, Duluth, Ga., assignors to Westinghouse Electric Corporation, East Pittsburgh, Pa., a corporation of Pennsylvania Application January 14, 1949, Serial No. 70,968

6 Claims. (Cl. 318—387)

Our invention relates, generally, to control systems and, more particularly, to systems for controlling the operation of electrically propelled vehicles, such as trolley coaches, street cars, multiple-unit cars and locomotives.

When an electric vehicle, such as a trolley coach, is required to start on excessive grades, it is desirable to provide for temporarily increasing the starting current above the normal setting of the current limit relay. Otherwise, it is necessary to set the limit relay higher than normal in order to permit the coach to start on a steep grade, only one or two of which may be encountered on the entire route travelled by the coach.

A manually operated push button and booster relay scheme has been utilized to obtain the increased current required for starting on steep grades. Such a scheme has the following disadvantages:

1. It permits the operator to call for extra power at any time, whether required or not, with consequent excessive duty and maintenance on the coach equipment and an acceleration rate which is uncomfortably high for the passengers.

2. It permits the operator to maintain the extra power longer than necessary on the critical grade.

3. It adds another duty for the operator which, if a hand-operated push button, is especially undesirable in traffic or on a curve and, if a foot operated switch, is too handy for overuse.

4. It requires the operator to release the button to obtain the shunted field or high speed operation.

An object of our invention is to provide a control system in which the foregoing disadvantages are overcome.

Another object of our invention is to provide for automatically increasing the setting of a current limit relay when operating on a predetermined grade.

A further object of our invention is to prevent extra power from being utilized during normal acceleration of an electric vehicle.

A more general object of our invention is to provide a control system which shall be simple and efficient in operation and which may be economically manufactured and installed.

Other objects of our invention will be explained fully hereinafter or will be apparent to those skilled in the art.

In accordance with one embodiment of our invention, a switch of the gravity or pendulum type is so mounted on a vehicle body that a circuit is established when the vehicle is on a predetermined grade, thereby energizing a booster relay which, in turn, increases the setting of the current limit relay to permit a higher starting current through the motor. Interlocking and holding circuits are provided to prevent the booster circuit from being established during normal acceleration and from being maintained longer than necessary.

For a better understanding of the nature and objects of our invention, reference may be had to the following detailed description, taken in conjunction with the accompanying drawing, in which the single figure is a diagrammatic view of a control system embodying the principal features of our invention.

Referring to the drawing, the system shown therein comprises a traction motor TM having an armature winding 10 and a series field winding 11; a line switch LS for connecting the motor TM to a power conductor 12 which may be energized from a trolley conductor 13 through a current collecting device 14; a plurality of reversing switches F1, F2, R1 and R2 for controlling the direction of operation of the motor TM and also connecting the motor to a power conductor 15 which is connected to a trolley conductor 16 through a current collecting device 17; a switch B which cooperates with certain of the reversing switches to establish dynamic braking connections for the motor TM as described in detail in the copending application of L. G. Riley, Serial No. 508,265, filed October 29, 1943, now Patent No. 2,456,892, issued December 21, 1948, and a switch E which connects the field winding 11 of the motor TM to the power conductor 12, thereby exciting the motor field during dynamic braking. A resistor 18 is connected in the excitation circuit for the field winding 11 and a resistor 19 is connected in the dynamic braking circuit for the motor TM.

The motor current is controlled during both acceleration and dynamic braking by a resistor R which is shunted from the motor circuit step-by-step by a controller CC which is provided with a plurality of contact members 1 to 9, inclusive, for shunting the resistor R. The controller CC may be of the cam or the drum type having a shaft 21 which is driven by an air engine 22 of a type well known in the art. The resistor 19 and a resistor 20 are connected in parallel-circuit relation with the resistor R during part of the accelerating cycle.

The air engine 22 is provided with a standard magnet valve SV and an inverted magnet valve IV. The operation of the air engine is automatically controlled during both acceleration and dynamic braking by a current limit relay LR having a series coil 23 which is connected in the motor circuit and is therefore responsive to the motor current during both acceleration and dynamic braking. The series coil 23 is divided into two sections, only one of which is utilized during acceleration and both of which are utilized during dynamic braking, thereby changing the calibration of the relay LR during braking.

The limit relay is also provided with a shunt coil L2 which is energized through a resistor 24 and contact members 25 of the switch LS during acceleration of the motor. The resistor 24 may be shunted from the circuit for the coil L2 by contact members 26 on a rate relay RR. The energization of the rate relay RR is controlled by a master controller MC, thereby permitting the operator to select the desired rate of acceleration.

The limit relay LR is also provided with a shunt coil L3, the energization of which is controlled by contact members 27 on the relay RR and contact members 28 on the switch LS. The coil L3 is provided for changing the calibration of the relay LR during dynamic braking, thereby permitting the operator to select the desired rate of dynamic braking.

As explained hereinbefore, it is desirable to provide for increasing the motor current above the normal setting of the limit relay in case the vehicle is required to start on an excessive grade. However, it is not desirable to permit the operator to change the setting of the limit relay since he may operate with the increased setting when unnecessary, thereby overloading the equipment and increasing the operating temperature. In order to automatically change the calibration of the limit relay LR, thereby increasing the motor current, we have provided for energizing the coil L3 on the relay LR by means of a booster relay BR which, in turn, is energized through a mercury switch MS which is so mounted on the vehicle that a circuit is established through the switch only when the vehicle is inclined on a predetermined grade. Suitable control circuits are provided on the controller MC for preventing normal acceleration from closing the mercury switch when starting on the level or grades less than that requiring the booster relay to function. Contact members 29 are also provided on the limit relay LR for opening the circuit through the actuating coil of the booster relay BR, thereby restoring the normal limit relay setting after the vehicle has started.

In case it is desirable to delay the restoration of the normal limit relay setting to keep the higher rate effective up to any desired coach speed, a transfer switch TS is provided for transferring the circuit for the relay BR from the contact members 29 of the relay LR to the controller CC having a contact segment 30 which may be constructed to open the circuit for the relay BR at any desired notch and vehicle speed.

A manually operable controller CS is provided for controlling the operation of the reversing switches, thereby controlling the direction of operation of the vehicle. The controller MC controls the operation of the control apparatus during acceleration and a controller BC controls the operation of the apparatus during dynamic braking. The controllers MC and BC are interlocked in the usual manner to prevent improper operation of the equipment in the event that both of the controllers are operated simultaneously.

In order that the functioning of the foregoing apparatus may be more clearly understood the operation of the system will now be described in more detail. Assuming that it is desired to accelerate the vehicle in a forward direction, the control switch CS is actuated to the forward position and the controller MC is actuated to position 1. At this time, an energizing circuit is established for the actuating coil of the switch LS which may be traced from positive through a contact segment 31 on the control switch CS, contact segments 32 and 33 on the controller MC, a contact segment 34 on the controller BC, conductor 35, an interlock 36 on the switch B, conductor 37, the actuating coil of the switch LS, conductor 38 and contact segments 39, 41 and 42 on the controller CC to negative. A holding circuit is established for the line switch LS through an interlock 44 on the switch LS.

At this time, the reversing switches F1 and F2 are also closed. The energizing circuit for the switch F1 extends from the conductor 35 through a contact segment 45 on the switch CS, conductor 46, an interlock 47 on the switch R1, conductor 48 and the actuating coil of the switch F1 to negative. The energizing circuit for the switch F2 may be traced from positive through a contact segment 49 on the switch CS, conductor 51, an interlock 52 on the switch R2, conductor 53 and the actuating coil of the switch F2 to negative.

The closing of the switches LS, F1 and F2 connects the traction motor TM across the power conductors 12 and 15 in series-circuit relation with the resistor R. The air engine 22 may be operated to shunt the resistor R from the motor circuit step-by-step by means of the controller CC by actuating the controller MC to positions 2, 3 or 4, depending upon the rate of acceleration desired.

When the controller MC is in position 2, the magnet valve SV is energized through a circuit which extends from the conductor 51 through an interlock 54 on the switch F2, conductor 55, an interlock 56 on the switch F1, conductor 57, contact segment 58 on the controller MC, conductor 59, a contact segment 61 on the controller CC, conductor 62, the coil of the magnet valve SV, conductor 63 and an interlock 64 on the switch LS to negative. The magnet valve IV is also energized at this time through a circuit which extends from the conductor 59, through the segment 61 on the controller CC, conductor 65, the contact members of the relay LR, conductor 66, the coil of the magnet valve IV, conductor 63 and the interlock 64 to negative.

As explained hereinbefore, the operation of the air engine 22 is under the control of the limit relay LR. Thus, when the motor current exceeds a predetermined amount the contact members of the relay LR are opened to deenergize the magnet valve IV, thereby stopping the progression of the controller CC. The operator of the vehicle may also stop the progression of the controller CC by holding the controller MC in position 2, thereby stopping the controller CC at a certain point in its travel. The operation of the controller CC may be resumed by actuating the controller MC to position 3.

As explained hereinbefore, the operator may select the desired rate of acceleration. Thus, when the master controller MC is on position 2 or 3 the relay RR is energized to provide a relatively low rate of acceleration. When the controller MC is on position 4, the relay RR is deenergized, thereby increasing the rate of acceleration by recalibrating the relay LR by means of the shunt coil L2, as previously explained.

If it is desired to decelerate the vehicle, the controller MC is actuated to the "off" position and the controller BC is actuated to one of the braking positions. When the controller MC is returned to the "off" position the switches LS and F1 are opened to disconnect the motor from the power circuit. Also the magnet valves of the air engine 22 are deenergized, thereby causing the controller CC to be returned to position 1.

When the controller BC is actuated to position 1 the switches B, R1 and F2 are closed to establish a dynamic braking circuit for the motor TM. The energizing circuit for the switch B may be traced from positive through the segment 31 on the switch CS, a segment 67 on the controller BC, a conductor 68, an interlock 69 on the switch LS, conductor 71, the actuating coil of the switch B, conductor 72 and contact segments 41 and 42 on the controller CC to negative. A holding circuit for the switch B is established through an interlock 73 on the switch B.

The energizing circuit for the switch E extends from the conductor 71 through the coil of the switch E, a contact segment 74 on the controller BC, conductor 75 and the contact segment 42 on the controller CC to negative. The energizing circuit for the switch F2 extends from the conductor 51 through an interlock 52 on the switch R2, conductor 53 and the actuating coil of the switch F2 to negative, as previously traced. The energizing circuit for the switch R1 extends from the conductor 51 through the interlock 54 on the switch F2, conductor 55, a contact segment 76 on the controller BC, conductor 77, an interlock 78 on the switch F1, conductor 79, the actuating coil of the switch R1, conductor 63 and an interlock 81 on the switch B to negative.

The closing of the switches B and R1 establishes a dynamic braking circuit for the motor TM through the resistors R and 19. This dynamic braking circuit includes the series field winding 11 and both sections of the series coil 23 of the relay LR. The field winding 11 is also connected across the power conductors 12 and 15 through the switches E and F2, thereby separately exciting the field winding 11 and insuring a prompt building up of the dynamic braking effect.

The controller CC is operated in a manner similar to that during acceleration to shunt the resistor R from the motor circuit step-by-step during dynamic braking. The operation of the controller CC is under the control of the limit relay LR which functions to prevent the motor current from increasing beyond the setting of the relay.

As explained hereinbefore, the setting of the relay LR may be changed by energizing the rate relay RR which in turn controls the energization of the shunt coil L3 on the relay LR. When the braking controller BC is in position 1 or 2 the relay RR is deenergized and the contact members 27 are closed, thereby energizing the coil L3 through a circuit which extends from the power conductor 12 through a resistor 82, contact members 27 on the relay RR, conductor 83, contact members 28 on the switch LS, conductor 84, the coil L3, conductor 85, the field winding 11, conductor 86 and the switch F2 to the power conductor 15. When the coil L3 is energized during braking the ampere turns are additive with those of the series coil and a lower notching current is obtained. When the braking controller BC is in position 3 the relay RR is energized through the segment 67 on the controller BC, thereby opening the contact members 27 to deenergize the coil L3, which increases the setting of the relay LR since only the series coil 23 is functioning to operate the relay.

As explained hereinbefore, the coil L3 may be utilized to increase the setting of the relay LR during acceleration of the motor TM. Thus, if the coil L3 is energized during acceleration its ampere turns are subtractive from the ampere turns of the series coil 23 since the current through the series coil flows in the opposite direction during acceleration from that during dynamic braking.

When the vehicle is standing on a predetermined grade and the controller MC is in the "off" position, the inclination of the vehicle causes a circuit to be established through the mercury switch MS, thereby energizing the booster relay BR which, in turn, causes the energization of the coil L3. The energizing circuit for the relay BR may be traced from the conductor 51 through an interlock 54 on the switch F2, which is closed during acceleration in the forward direction, conductor 55, a contact segment 87 on the controller MC, conductor 77, the switch MS, conductor 88 and the actuating coil of the relay BR to negative. A holding circuit for the relay BR is established through an interlock 89 on the relay BR, conductor 91, contact members 29 on the relay LR, the transfer switch TS and the conductor 88 to the coil of the relay BR.

The closing of the relay BR establishes an energizing circuit for the coil L3 of the relay LR which extends from the power conductor 12 through the resistor 82, conductor 92, contact members 93 on the relay BR, conductor 84, the coil L3 and thence to the power conductor 15 through a circuit previously traced.

The coil L3 will remain energized until the motor current is sufficient to operate the limit relay LR, thereby opening its contact members 29 to interrupt the holding circuit for the booster relay BR. In this manner the motor current is increased sufficiently to enable the vehicle to start on the steep grade. If the grade is relatively short it will be satisfactory to restore the limit relay to its normal setting upon the first operation of the relay in the manner previously explained.

However, if the vehicle is required to proceed up a relatively long and steep grade the restoration of the normal setting of the limit relay may be placed under the control of the controller CC by actuating the transfer switch TS to its uppermost position. Thus, the holding circuit for the relay BR is transferred from the contact members 29 of the relay LR to the contact segment 30 on the controller CC.

As previously explained, the contact segment 30 may be constructed to interrupt the holding circuit for the relay BR at any desired notch and hence any vehicle speed. However, the relay BR must be deenergized and close its contact members 94 and the controller MC must be on position 4 to enable the controller CC to advance past the twelfth notch as the energizing circuit for the coil of the magnet valve IV extends from conductor 57 through a segment 95 on the controller MC, conductor 96, the contact members 94 on the relay BR, conductor 65, the contact members of the relay LR, conductor 66, the coil of the magnet valve IV, conductor 63 and the interlock 64 on the switch LS to negative.

Under normal starting conditions on the level or on grades less than those requiring the booster operation, the mercury switch MS is not closed at standstill and the controller MC "off" interlock is opened by advancing the master controller before power is applied and the acceleration of the coach closes the mercury switch. Therefore, the booster relay is not energized under these conditions.

In this manner the operator is prevented from utilizing the higher accelerating current under normal starting conditions when it is not necessary. The higher accelerating current is automatically provided when required and is automatically cut off after the vehicle has been started. Furthermore, the higher accelerating current may be automatically provided for any predetermined degree of grade by adjusting the inclination of the mercury switch. As previously explained, the time during which the higher accelerating current is provided may be adjusted by changing the length of the contact segment 30 on the controller CC.

From the foregoing description it is apparent that we have provided a system for automatically increasing the accelerating current for the propelling motor of a vehicle when the vehicle is required to start on excessive grades. The present system relieves the operator of any action or decision as to when the higher rate is needed and it limits the length of time the extra power is provided to the actual requirements of the grade. The operator is prevented from utilizing the extra power when not required, thereby preventing unnecessary overheating of the equipment.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system for a motor which drives a vehicle, in combination, power conductors, switching means for connecting the motor to the power conductors, a controller for controlling the operation of said switching means, control means for controlling the motor current, a switch responsive to the inclination of the vehicle for controlling said control means, and contact members on said controller for controlling the energization of said switch, said contact members being opened when the controller is actuated to accelerate the vehicle.

2. In a control system for a motor which drives a vehicle, in combination, power conductors, switching means for connecting the motor to the power conductors, a controller for controlling the operation of said switching means, control means for controlling the motor current, a switch responsive to the inclination of the vehicle for controlling said control means, and contact members on said controller for controlling the energization of said switch, said contact members being closed when said controller is in the off position.

3. In a control system for a motor which drives a vehicle, in combination, power conductors, switching means for connecting the motor to the power conductors, a controller for controlling the operation of said switching means, control means for controlling the motor current, a relay responsive to the motor current for controlling the operation of said control means, a switch responsive to the inclination of the vehicle for recalibrating said relay to permit an increase in the motor current, and contact members on said controller for controlling the energization of said switch.

4. In a control system for a motor which drives a vehicle, in combination, power conductors, switching means for connecting the motor to the power conductors, a controller for controlling the operation of said switching means, control means for controlling the motor current, a relay responsive to the motor current for controlling the operation of said control means, a booster relay for changing the calibration of said current responsive relay, a switch responsive to the inclination of the vehicle for controlling the energization of said booster relay, and contact members on said controller for controlling the energization of said switch.

5. In a control system for a motor which drives a vehicle, in combination, power conductors, switching means for connecting the motor to the power conductors, a controller for controlling the operation of said switching means, control means for controlling the motor current, a relay responsive to the motor current for controlling the operation of said control means, a booster relay for changing the calibration of said current responsive relay, a switch responsive to the inclination of the vehicle for controlling the energization of said booster relay, contact members on said controller for controlling the energization of said switch, and contact members on said relays for establishing a holding circuit for said booster relay.

6. In a control system for a motor which drives a vehicle, in combination, power conductors, switching means for connecting the motor to the power conductors, a controller for controlling the operation of said switching means, control means for controlling the motor current, a relay responsive to the motor current for controlling the operation of said control means, a booster relay for changing the calibration of said current responsive relay, a switch responsive to the inclination of the vehicle for controlling the energization of said booster relay, contact members on said controller for controlling the energization of said switch, and contact members on said booster relay and said control means for establishing a holding circuit for the booster relay.

HERBERT H. WENTWORTH.
JOHN M. JEFFREY.

REFERENCES CITED

The following references are of record in the file of this patent:

UNITED STATES PATENTS

| Number | Name | Date |
|---|---|---|
| 2,400,971 | Barclay | May 28, 1946 |
| 2,481,989 | Eddison | Sept. 13, 1949 |